US009169452B2

(12) United States Patent
Dolmazon et al.

(10) Patent No.: US 9,169,452 B2
(45) Date of Patent: Oct. 27, 2015

(54) MODIFIED ALKYL-PHENOL-ALDEHYDE RESINS, USE THEREOF AS ADDITIVES FOR IMPROVING THE PROPERTIES OF LIQUID HYDROCARBON FUELS IN COLD CONDITIONS

(75) Inventors: Nelly Dolmazon, Serezin du Rhone (FR); Géraldine Papin, Lyons (FR); Frédéric Tort, Brignais (FR)

(73) Assignee: TOTAL RAFFINAGE MARKETING, Puteaux (FR)

( * ) Notice: Subject to any disclaimer, the term of this patent is extended or adjusted under 35 U.S.C. 154(b) by 171 days.

(21) Appl. No.: 13/992,178

(22) PCT Filed: Dec. 21, 2011

(86) PCT No.: PCT/IB2011/055863
§ 371 (c)(1),
(2), (4) Date: Jun. 6, 2013

(87) PCT Pub. No.: WO2012/085865
PCT Pub. Date: Jun. 28, 2012

(65) Prior Publication Data
US 2013/0255139 A1    Oct. 3, 2013

(30) Foreign Application Priority Data

Dec. 23, 2010 (FR) ..................... 10 61193

(51) Int. Cl.
| | | |
|---|---|---|
| *C10L 1/2387* | (2006.01) | |
| *C08G 8/12* | (2006.01) | |
| *C08G 8/28* | (2006.01) | |
| *C10L 1/00* | (2006.01) | |
| *C10L 1/02* | (2006.01) | |
| *C10L 1/18* | (2006.01) | |
| *C10L 10/14* | (2006.01) | |
| *C10L 1/238* | (2006.01) | |

(52) U.S. Cl.
CPC ............... *C10L 1/2387* (2013.01); *C08G 8/12* (2013.01); *C08G 8/28* (2013.01); *C10L 1/00* (2013.01); *C10L 1/02* (2013.01); *C10L 1/026* (2013.01); *C10L 1/18* (2013.01); *C10L 1/238* (2013.01); *C10L 10/14* (2013.01); *C10L 2200/0476* (2013.01); *C10L 2200/0484* (2013.01)

(58) Field of Classification Search
CPC .......... C10L 1/2387; C10L 1/00; C10L 1/02; C10L 1/026; C10L 1/18; C10L 1/238; C10L 10/14; C10L 2200/0484; C08G 8/12; C08G 8/28
See application file for complete search history.

(56) References Cited

U.S. PATENT DOCUMENTS

| | | | |
|---|---|---|---|
| 2,743,252 A | 4/1956 | De Groote | |
| 2,743,253 A | 4/1956 | De Groote | |
| 2,771,440 A | 11/1956 | De Groote | |
| 2,839,497 A | 6/1958 | De Groote | |
| 4,146,512 A * | 3/1979 | Weaver et al. | 523/200 |
| 4,511,369 A | 4/1985 | Denis et al. | |
| 4,652,273 A | 3/1987 | Maldonado et al. | |
| 4,664,676 A | 5/1987 | Denis et al. | |
| 4,731,095 A | 3/1988 | Garapon et al. | |
| 4,900,332 A | 2/1990 | Denis et al. | |
| 5,039,437 A | 8/1991 | Martella et al. | |
| 5,106,515 A | 4/1992 | Denis et al. | |
| 5,256,740 A | 10/1993 | Denis et al. | |
| 5,449,386 A | 9/1995 | Denis et al. | |
| 5,456,730 A | 10/1995 | Hart et al. | |
| 5,558,683 A | 9/1996 | Loper | |
| 5,730,029 A | 3/1998 | Stoldt et al. | |
| 5,998,530 A | 12/1999 | Krull et al. | |
| 6,071,318 A | 6/2000 | Mallet et al. | |
| 6,083,287 A | 7/2000 | Germanaud et al. | |
| 6,232,277 B1 | 5/2001 | Ledeore et al. | |
| 6,511,520 B1 | 1/2003 | Eber et al. | |
| 7,374,589 B2 | 5/2008 | Bernasconi et al. | |
| 8,298,402 B2 | 10/2012 | Krull et al. | |
| 2005/0223631 A1 | 10/2005 | Jackson | |
| 2007/0062102 A1 | 3/2007 | Krull et al. | |
| 2009/0090047 A1* | 4/2009 | Stark et al. | 44/385 |
| 2010/0275508 A1 | 11/2010 | Dolmazon et al. | |
| 2010/0281762 A1 | 11/2010 | Chevrot et al. | |
| 2010/0299992 A1 | 12/2010 | Reid | |
| 2011/0118159 A1 | 5/2011 | Ahlers et al. | |
| 2012/0077721 A1 | 3/2012 | Dolmazon et al. | |

FOREIGN PATENT DOCUMENTS

| | | |
|---|---|---|
| AU | 609778 B2 | 5/1991 |
| CA | 1321444 C | 8/1993 |

(Continued)

OTHER PUBLICATIONS

International Preliminary Report on Patentability for PCT/IB2011/055863, IB, Geneva, incorporating the English translation of the Written Opinion of the ISA, ISA/EP, mailed Mar. 23, 2012. 17858586.1.

(Continued)

*Primary Examiner* — Cephia D Toomer

(74) *Attorney, Agent, or Firm* — Harness, Dickey & Pierce, P.L.C.

(57) ABSTRACT

Modified alkylphenol-aldehyde resins include one or more alkylamines, having preferably at least one primary amine type group as well as their use for improving the flow properties of motor fuels and hydrocarbon fuels, such as in particular jet fuel, gas oil, fuel oil domestic, heavy fuel oil.

7 Claims, No Drawings

(56) References Cited

FOREIGN PATENT DOCUMENTS

| | | |
|---|---|---|
| CA | 2145168 A1 | 3/1994 |
| CA | 2146573 A1 | 6/1994 |
| CA | 2154344 A1 | 8/1994 |
| EP | 0261959 A2 | 3/1988 |
| EP | 1584673 A1 | 10/2005 |
| FR | 2772783 A1 | 6/1999 |
| GB | 2121808 A | 1/1984 |
| WO | WO-9314178 A1 | 7/1993 |
| WO | WO-9961498 | 12/1999 |
| WO | WO-2009040582 | 4/2009 |

OTHER PUBLICATIONS

Japanese Office Action dated May 12, 2015—English Translation.

* cited by examiner

MODIFIED ALKYL-PHENOL-ALDEHYDE RESINS, USE THEREOF AS ADDITIVES FOR IMPROVING THE PROPERTIES OF LIQUID HYDROCARBON FUELS IN COLD CONDITIONS

CROSS-REFERENCE TO RELATED APPLICATIONS

This application is a National Phase Entry of International Application No. PCT/IB2011/055863, filed on Dec. 21, 2011, which claims priority to French Patent Application Serial No. 1061193, filed on Dec. 23, 2010, both of which are incorporated by reference herein.

BACKGROUND AND SUMMARY

The present invention relates to novel alkylphenol-aldehyde resins which can be used in particular as wax anti-settling additives for oils and oil distillates and in particular for motor fuels and liquid hydrocarbon fuels.

The alkylphenol-aldehyde resins originating from the condensation of alkyl phenol and aldehyde have been known for a long time as agents for improving the flow of mineral oils. See for example, EP 311 452 which describes condensation products of at least 80% mol of dialkylphenols and aldehydes having 1 to 30 carbon atoms; EP 857 776 which describes the use of alkylphenol-aldehyde resins in which the alkyl groups of alkylphenol have 4 to 12 carbon atoms and the aldehyde has 1 to 4 carbon atoms and containing no more than 10% mol of alkylphenols having more than one alkyl group, in combination with ethylene/vinyl ester co- or ter-polymers for improving the fluidity of mineral oils; and EP 1 584 673 which describes alkylphenol-aldehyde resins of Mn between 1000 and 3000 originating from the condensation of a C1-C4 aldehyde and a mixture of alkylphenols with a majority of monoalkylphenol, the alkyl group having 1 to 20 carbon atoms intended to improve the low temperature flow properties of motor fuel compositions. Modified alkylphenol-aldehyde resins have also been proposed as additives for improving the low temperature flow of mineral oils; EP 1 767 610 describes alkylphenol resins, the condensation reaction of which with the aldehydes is carried out in the presence of fatty acids having 2 to 50 carbon atoms, or their derivatives, such as esters.

The present invention proposes novel modified alkylphenol-aldehyde resins which can be used for improving the low temperature stability of motor fuels and liquid hydrocarbon fuels and more particularly the low temperature flow by limiting the settling of waxes contained in the motor fuels and liquid fuels. The modified alkylphenol-aldehyde resins according to the invention can be obtained by a Mannich reaction of an alkylphenol-aldehyde condensation resin with at least one aldehyde and/or one ketone having 1 to 8 carbon atoms, preferably having 1 to 4 carbon atoms;
and at least one hydrocarbon compound having at least one alkylmonoamine or alkylpolyamine group (i.e. having several amine groups) having between 4 and 30 carbon atoms, called hereafter alkylamine,
the alkylphenol-aldehyde condensation resin can itself be obtained by condensation
of at least one alkylphenol substituted by at least one linear or branched alkyl group having 1 to 30 carbon atoms, preferably a monoalkylphenol,
with at least one aldehyde and/or one ketone having 1 to 8 carbon atoms, preferably 1 to 4 carbon atoms.

The alkylphenol-aldehyde resins are known per se. According to a preferred embodiment, the modified alkylphenol-aldehyde resins according to the invention can be obtained from at least one alkylphenol substituted in para position; preferably at least nonylphenol. The average number of phenolic nuclei per molecule of preferred nonylphenol-aldehyde resin is preferably superior to 6 and inferior or equal to 25, more preferably comprised within the range 8 to 17, and advantageously within the range 9 to 16 phenolic nuclei per molecule. The average number of phenolic nuclei per molecule can be determined by RMN or GPC.

According to a preferred embodiment, the modified alkylphenol-aldehyde resins according to the invention can be obtained from at least one aldehyde and/or one ketone chosen from formaldehyde, acetaldehyde, propionaldehyde, butyraldehyde, 2-ethyl hexanal, benzaldehyde, acetone, preferably at least formaldehyde. According to a preferred embodiment, the modified alkylphenol-aldehyde resins according to the invention can be obtained from at least one alkylamine having at least one primary amine group, and advantageously at least one compound, all the amine groups of which are primary amines. According to a preferred embodiment, the modified alkylphenol-aldehyde resins according to the invention can be obtained from at least one alkylamine with an aliphatic chain having between 12 and 24 carbon atoms, preferably between 12 and 22 carbon atoms. According to a particularly preferred embodiment, the modified alkylphenol-aldehyde resins according to the invention can be obtained from at least one alkylamine having at least one primary amine group and comprising an aliphatic chain having between 12 and 24 carbon atoms, preferably between 12 and 20 carbon atoms.

The commercially-available alkylamines are in general not pure compounds but mixtures. Among the commercially-available alkylamines which are suitable, there can in particular be mentioned the following alkylamines with an aliphatic chain marketed under the names: Noram®, Duomeen®, Dinoram®, Trinoram®, Triameen®, Armeen®, Polyram®, Lilamin® and Cemulcat®. The viscosity of the modified alkylphenol-aldehyde condensation resins according to the invention diluted with 30% by mass of aromatic solvent measured at 50° C. using a dynamic rheometer with a shear rate of 100 s$^{-1}$ is in general comprised between 1,000 and 10,000 mPa·s, preferably between 1,500 and 6,000 mPa·s, and advantageously between 2,500 and 5,000 mPa·s.

The modified alkylphenol-aldehyde resins according to the invention can be used as additives for improving the low temperature properties of fuel oils and of oil distillates of petroleum origin and/or of renewable origin, and more particularly of the middle distillates the boiling temperature range of which is in the majority comprised between 100 and 500° C. Crude oils and the middle distillates, obtained from crude oils of petroleum origin by distillation, such as gas oil, diesel motor fuel or fuel oil domestic, contain, depending on the origin of the crude oil, different quantities of n-alkanes or n-paraffins which by lowering the temperature, typically below 0° C., crystallize out as lamellar crystals which have tendency to agglomerate: there is then a deterioration in the flow characteristics of the oils and distillates; difficulties occur during transport, storage and/or use of the oil or fuel: the wax crystals having tendency to block pipes, fuel lines, pumps and filters, for example in automobile vehicle fuel systems.

In winter or in conditions of use of the oil or the distillate at a temperature below 0° C., the crystallization phenomena can lead to deposits on the pipe walls, even a complete blockage. These problems are well known in the field of motor fuels and liquid hydrocarbon fuels where numerous additives or mixtures of additives have been proposed and are marketed for reducing the size of the wax crystals and/or changing their shape and/or preventing their formation. The smallest possible crystal size is preferred as it minimizes the risks of blockage or clogging the filter. The usual agents for improving the flow of crude oils and middle distillates are co- and ter-polymers of ethylene and vinyl and/or acrylic ester(s) alone or in a mixture with low molecular weight oil-soluble compounds or polymers which contain one or more ester, amide, imide, ammonium groups substituted by at least one alkyl chain.

Apart from improving the flow of the oil and the distillate, another purpose of the additives for improving the flow is to ensure the dispersion of the wax crystals so as to delay or prevent the settling of the wax crystals and therefore the formation of a layer rich in waxes at the bottom of receptacles, vessels or storage tanks; these additives for dispersing waxes are called WASA (acronym for the term wax anti-settling additive). The inventors have noted that the modified alkylphenol-aldehyde resins according to the invention have a wax dispersing activity: they make it possible to limit the settling of the crystallized waxes without further addition of dispersing agent. Thus a mixture of co- and/or ter-polymer(s) of ethylene and vinyl ester(s) and/or acrylic ester(s) with at least one modified alkylphenol-aldehyde resin which is a subject of the invention makes it possible to avoid the settling of wax crystals at low temperature.

The modified alkylphenol-aldehyde resins according to the invention can be used for improving the low temperature behaviour and in particular the dispersion of the waxes in motor fuels and liquid fuels based on hydrocarbon oils and middle distillates the range of boiling temperatures of which is in the majority comprised between 100 and 500° C. In particular the motor fuels and liquid fuels to which the modified alkylphenol-aldehyde resins according to the invention are added are for example jet fuel, gas oil or motor diesel fuel, fuel oil domestic, heavy fuel oil which have a boiling range from 120 to 500° C., preferably 140 to 400° C. In general the sulphur content of the compositions of motor fuels and liquid fuels is less than 5,000 ppm, preferably less than 500 ppm, and more preferentially less than 50 ppm, even less than 10 ppm and advantageously with no sulphur, in particular for the motor fuels of gas oil and jet type.

Another object of the present invention is compositions of motor fuels and liquid hydrocarbon fuels the boiling temperatures range of which is in the majority comprised between 100 and 500° C. comprising:

a majority proportion of hydrocarbon compounds and/or vegetable and/or animal oils and/or their esters of oils and/or biodiesels of animal and/or vegetable origin and a minority proportion, preferably comprised between 5 and 5,000 ppm by mass of at least one of the resins according to the invention.

The motor fuels and liquid fuels comprise the middle distillates with a boiling temperature comprised between 100 and 500° C.; their initial crystallization temperature ICT is often greater than or equal to −20° C., in general comprised between −15° C. and +10° C. These distillates can for example be chosen from the distillates obtained by direct distillation of crude hydrocarbons, the distillates from vacuum distillation, hydrotreated distillates, distillates originating from catalytic cracking and/or hydrocracking of distillates under vacuum, distillates resulting from conversion processes of ARDS (atmospheric residue desulphuration) type and/or visbreaking, distillates originating from upgrading of Fischer-Tropsch cuts, distillates resulting from BTL (biomass to liquid) conversion of vegetable and/or animal biomass, and/or their mixtures. The motor fuels and liquid fuels can also contain distillates originating from refining operations which are more complex than those originating from the direct distillation of the hydrocarbons which can for example originate from cracking, hydrocracking and/or catalytic cracking processes and visbreaking processes.

The motor fuels and liquid fuels can also contain new sources of distillates, among which there can in particular be mentioned:

the heaviest cuts originating from the cracking and visbreaking processes with a high concentration of heavy paraffins, comprising more than 18 carbon atoms, synthetic distillates originating from the conversion of gas such as those originating from the Fischer Tropsch process, synthetic distillates resulting from the treatment of biomass of vegetable and/or animal origin, such as in particular NExBTL, and the vegetable and/or animal oils and/or their esters such as methyl or ethyl esters of vegetable oils (MEVO, EEVO), hydrotreated and/or hydrocracked and/or hydrodeoxygenated (HDO) vegetable and/or animal oils, or also biodiesels of animal and/or vegetable origin.

These new motor fuel and fuel bases can be used alone or in a mixture with standard petroleum middle distillates as a motor fuel base and/or fuel oil domestic base; they generally comprise long paraffin chains greater than or equal to 10 carbon atoms and preferably C14 to C30.

According to an embodiment of the invention, the modified alkylphenol-aldehyde resins according to the invention are used in motor fuels and liquid fuels in combination with at least one additive improving the low-temperature flow, such as the co-polymers and ter-polymers of ethylene and vinyl and/or acrylic ester(s). By way of example of additives improving the low-temperature flow of copolymer type, there can be mentioned the EVAs (copolymers of ethylene and vinyl acetate); as examples of ter-polymers, there can be mentioned those which are described in EP 1 692 196, WO09/106,743, WO09/106,744. According to an embodiment of the invention, the modified alkylphenol-aldehyde resins according to the invention can be used in combination with at least one wax-dispersing additive different from the modified alkylphenol-aldehyde resins according to the invention. Among the wax-dispersing additives, there can be mentioned the polar nitrogenous compounds.

According to a preferred embodiment, the modified alkylphenol-aldehyde resins according to the invention are used in motor fuels and liquid fuels without the addition of dispersant, chosen for example from the polar nitrogenous compounds. According to a preferred embodiment, the modified alkylphenol-aldehyde resins according to the invention are used in combination with at least one wax-dispersing additive different from the modified alkylphenol-aldehyde resins according to the invention, such as for example an unmodified alkylphenol-aldehyde resin and optionally with at least one additive improving the low-temperature flow.

According to a preferred embodiment, each additive separately or the mixtures of additives are dissolved or dispersed with one or more solvent or dispersing agents before adding to the oils or the distillates. Solvent or dispersing agents are for example aliphatic and/or aromatic hydrocarbons or mixtures of hydrocarbons, for example fractions of gasoline, kerosene, decane, pentadecane, toluene, xylene, and/or ethylbenzene and/or mixtures of commercial solvents such as Solvarex 10, Solvarex LN, Solvent Naphtha, Shellsol AB, Shellsol D, Solvesso 150, Solvesso 150 ND, Solvesso 200, Exxsol, ISOPAR. Polar dissolution adjuvants, such as 2-ethylhexanol, decanol, isodecanol and/or isotridecanol can also be added.

Apart from the additives mentioned in the embodiments above, namely the modified alkylphenol-aldehyde resins according to the invention, the additives for improving the low-temperature flow, the wax-dispersing additives, other additives can also be added such as corrosion inhibiting agents, detergent additives, anti-clouding agents, additives improving the conductivity, colorants, reodorants, lubricity or lubricating additives, etc. Among these other additives, there can be particularly mentioned:

a) the procetane additives, in particular (but not limitatively) chosen from the alkyl nitrates, preferably 2-ethyl hexyl nitrate, the aroyl peroxides, preferably benzyl peroxide, and alkyl peroxides, preferably di ter-butyl peroxide;

b) the anti-foam additives, in particular (but not limitatively) chosen from the polysiloxanes, the oxyalkylated polysiloxanes, and the fatty acid amides originating from vegetable or animal oils; examples of such additives are given in EP 663 000, and EP 736 590;

c) the detergent and/or anti-corrosion additives, in particular (but not limitatively) chosen from the group constituted by the amines, succinimides, alkenylsuccinimides, polyalkylamines, polyalkyl polyamines and polyetheramines; examples of such additives are given in EP 938 535.

d) lubricity additives or anti-wear agent, in particular (but not limitatively) chosen from the group constituted by the fatty acids and their ester or amide derivatives, in particular glycerol monooleate, and mono- and polycyclic carboxylic acid derivatives; examples of such additives are given in the following documents: EP 680 506, EP 860 494, WO 98/04656, EP 915 944, FR 2 772 783, FR 2 772 784.

e) the cloud point additives, in particular (but not limitatively) chosen from the group constituted by the long-chain olefin/(meth)acrylic ester/maleimide terpolymers, and fumaric/maleic acid ester polymers. Examples of such additives are given in EP 71 513, EP 100 248, FR 2 528 051, FR 2 528 423, EP 112 195, EP 1 727 58, EP 271 385, EP 291 367;

f) anti-settling additives and/or wax dispersants in particular (but not limitatively) chosen from the group constituted by (meth)acrylic acid/polyamine-amidified alkyl (meth)acrylate copolymers, polyamine alkenylsuccinimides, the derivatives of phthalamic acid and of double-chain fatty amine; alkylphenol/aldehyde resins that differ from the alkylphenol/aldehyde resins according to the invention; Examples of such additives are given in EP 261 959, EP 593 331, EP 674 689, EP 327 423, EP 512 889, EP 832 172; U.S. Patent Publication No. 2005/0223631; U.S. Pat. No. 5,998,530; WO 93/14178;

g) the cold operability multi-functional additives chosen from the group constituted by the polymers based on olefin and alkenyl nitrate as described in EP 573 490;

h) other additives improving resistance to cold and filterability (CFI), such as the EVA and/or EVP copolymers;

i) anti-oxidants of hindered phenolic type or amines of alkylated paraphenylene diamine type;

j) metal passivators, such as triazoles, alkylated benzotriazoles;

k) metal sequestering agents such as disalicylidene propane diamine (DMD)

l) acidity neutralizers such as cyclic alkylamines;

These other additives as well as the modified alkylphenol-aldehyde resins according to the invention are in general added in a quantity ranging from 5 to 1,000 ppm (each)

DETAILED DESCRIPTION

EXAMPLE 1

Synthesis of Modified Alkylphenol-Aldehyde Resins by a Mannich Reaction

In a first stage, several alkylphenol-aldehyde resins are prepared by condensation of para-nonylphenol and formaldehyde (for example according to the operating method described in EP 857 776) with viscosities at 50° C. (measured at 50° C. using a dynamic rheometer with a shear rate of 10 s$^{-1}$ on the resin diluted with 30% by mass of aromatic solvent (Solvesso 150) comprised between 1,800 and 4,800 mPa·s. In a second stage, the alkylphenol-aldehyde resins originating from the first stage are modified by a Mannich reaction by the addition of formol and primary alkyl(poly)amine (for example an alkylpolyamine having a C12 alkyl chain (marketed under the name Noram® C) for the resin (1 A)).

The characteristics of the resins obtained are shown in the table 1 below: alkylamine used, amount of dry material, viscosity at 50° C. (measured on resin diluted with 30% by mass of Solvesso 150, shear rate 10 s$^{-1}$).

TABLE 1

| Resin N° | alkylamine used | Dry material (1 g-30 min-200° C) | Viscosity at 50° C. (mPa · s) | Average number of phenolic nuclei per resin molecule |
|---|---|---|---|---|
| 1A | Noram C | 72.2% | 3700 | 8.0 |
| 2A | Trinoram S | 70.30% | 3675 | 4.1 |
| 2B | Trinoram S | 70.20% | 1950 | 1.4 |
| 2C | Trinoram S | 70.10% | 4855 | 14.1 |
| 2D | Trinoram S | 69.80% | 4590 | 16.5 |
| 2E | Trinoram S | 69.00% | 3180 | 10.1 |
| 2F | Trinoram S | 70.10% | 4990 | 15.5 |
| 3A | Noram SH | 72.80% | 2485 | 3.7 |

EXAMPLE 2

ARAL Sedimentation Tests

Each of the modified alkylphenol resins of Example 1 are evaluated as anti-settling additive or WASA alone (i.e. not combined with another WASA dispersing constituent) in a gas oil (GOM 1) to which is added 300 ppm by mass of a CFPP additive which is an EVA in solution at 70% by mass in an aromatic solvent (Solvesso 150 type) marketed under the name CP7936C. Each modified alkylphenol resin is incorporated in the gas oil at a concentration of 70 ppm by mass (the resin being dissolved with 30% by mass of solvent, 100 ppm by mass of solution at 70% of active substance is used). By way of comparison, the gas oil GOM 1 to which is added 300 ppm of the CFPP additive described previously and the unmodified alkylphenol-aldehyde resin (comparative resin 1 with a viscosity measured at 50° C. using a dynamic rheometer diluted with 30% by mass Solvesso 150 equal to 2,000 mPa·s) are also evaluated.

The anti-settling properties of the additives are evaluated by the following ARAL settling test: 500 mL of middle distillate additives are cooled in a 500 mL test tube in a climatic chamber to −13° C. according to the following temperature cycle: passing from +10° C. to −13° C. in 4 h then isothermal at −13° C. for 16 h. At the end of the test, a visual score of the appearance of the sample and the volume of the settled phase is carried out, then the 20% constituting the volume at the bottom is taken out, for determination of cloud point CP (NF EN 23015) and CFPP (NF EN 116). Then the difference in the CP and CFPP is compared before and after settling (i.e. on the 20% volume at the bottom of the test tube), the lower difference, the better the performance of the CP, CFPP property measured.

The results are shown in Table 2 below.

TABLE 2

| Added resin N° | Volume of sediments (mL for 500 mL of sample) | Visual score | CFPP measurement (° C.) NF EN 116 | | | CP measurement (° C.) NF EN 23015 | | |
|---|---|---|---|---|---|---|---|---|
| | | | Before | After | Difference | Before | After | Difference |
| — | | | −16 | | | | | |
| Comparative Resin 1 | 115 | slightly cloudy | −16 | −4 | −12 | −6 | 4 | −10 |
| Resin 1A | 90 | cloudy | −18 | −9 | −9 | −5 | 0 | −5 |
| Resin 2A | 35 | cloudy | −19 | −10 | −9 | −6 | −2 | −4 |
| Resin 2B | 50 | cloudy | −19 | −13 | −6 | −6 | −2 | −4 |
| Resin 2C | 0 | homogeneous | −18 | −19 | 1 | −6 | −6 | 0 |
| Resin 3A | 105 | slightly cloudy | −18 | −4 | −14 | −6 | 3 | −9 |

It is noted that the unmodified standard alkylphenol resin (comparative resin 1) is not effective as regards anti-settling when it is used alone (i.e. without the addition of dispersant) whereas the modified alkylphenol resins according to the invention are, the most effective being the resin 2C, containing tallow dipropylenetriamine, particularly preferred. New ARAL sedimentation tests are carried out with the same gas oil of which the additivation rate of CFPP additive is unchanged (300 ppm) but for which the additivation rate of modified alklphenol-aldehyde resin (resin 2C) is different; once again, the modified alkylphenol-aldehyde resin is added in a solution concentrated to 70% by mass of active substance (resin) in 30% of solvent. By way of comparison, the gas oil GOM 1 to which is added 300 ppm of the CFPP additive described previously and an unmodified alkylphenol-aldehyde resin (comparative resin 1) combined with a nitrogenous polar dispersant of amidified dodecenylsuccinic anhydride type with a tallow dipropylenetriamine.

The mixture of additives contains 20% by mass of resin 1 and 80% by mass of polar amidified dodecenylsuccinic anhydride dispersant with a tallow dipropylenetriamine. The results are shown in Table 3 below.

TABLE 3

| WASA additive(s) used | Resin added (ppm of solution at 70% m of active substance) | Test tube visual score (volume of sediments in mL on 500 mL of sample) | | CFPP measurement (° C.) NF EN 116 | | | CP measurement (° C.) NF EN 23015 | | |
|---|---|---|---|---|---|---|---|---|---|
| | | | | Before | After | Difference | Before | After | Difference |
| No WASA | 0 | | | −16 | | | | | |
| Resin 2C | 75 | <5 | homogeneous | −20 | −17 | −3 | −6 | −6 | 0 |
| comparative Resin 1 + dispersant | 75 | <10 | homogeneous | −18 | −17 | −1 | −7 | −6 | −1 |
| Resin 2C | 50 | 10 | | −19 | −17 | −2 | −6 | −6 | 0 |
| comparative Resin 1 + dispersant | 50 | <10 | homogeneous | −20 | −19 | −1 | −7 | −6 | −1 |
| Resin 2C | 25 | 10 | homogeneous | −18 | −18 | 0 | −6 | −6 | 0 |
| comparative Resin 1 + dispersant | 25 | 125 | Cloudy at the bottom | −18 | −9 | −9 | −6 | 1 | −7 |
| Resin 2C | 15 | 15 | homogeneous | −18 | −19 | 1 | −6 | −5 | −1 |
| comparative Resin 1 + dispersant | 15 | 115 | Cloudy at the bottom | −16 | −7 | −9 | −6 | 1 | −7 |

These results relating to the effectiveness of anti-settling as a function of concentration (of active substance) show that the modified alkylphenol resin 2C according to the invention is more effective than the combination of standard alkylphenol resin+dispersant (polar nitrogenous compound) below 50 ppm of active substance. New ARAL sedimentation tests are carried out with the resin 2C in 2 other engine gas oils (GOM 2 (gas oil of type B5, i.e. containing 5% by volume of MEVO)

and GOM 3 (gas oil of type B0 without MEVO) the characteristics of which are shown in Table 6 below. By way of comparison, the anti-settling effectiveness of an unmodified alkylphenol-aldehyde resin (comparative resin 1) combined with a polar nitrogenous compound dispersant of dodecenyl-succinic anhydride type with a tallow dipropylenetriamine is evaluated; the results are shown in Tables 4 (tests in GOM 2) and 5 (tests in GOM 3)

TABLE 4 evaluation in GOM 2

| WASA additive(s) used | Resin added (ppm of solution at 70% m of active substance) | Test tube visual score 500 mL | CFPP measurement (° C.) NF EN 116 | | | CP measurement (° C.) NF EN 23015 | | |
|---|---|---|---|---|---|---|---|---|
| | | | Before | After | Difference | Before | After | Difference |
| comparative Resin 1 + dispersant | 112.5 | 100 | −27 | −10 | 17 | −4 | 1 | 5 |
| Resin 2C | 112.5 | <5 | −21* | −16 | 5 | −4 | −4 | 0 |

*hard point at −16° C.

TABLE 5 evaluation in GOM 3

| WASA additive(s) used | Resin added (ppm of solution at 70% m of active substance) | Test tube visual score 500 mL | CFPP measurement (° C.) NF EN 116 | | | CP measurement (° C.) NF EN 23015 | | |
|---|---|---|---|---|---|---|---|---|
| | | | Before | After | Difference | Before | After | Difference |
| comparative Resin 1 + dispersant | 100 | 0 | −19 | −19 | 0 | −7 | −7 | 0 |
| Resin 2C | 100 | <5 | −19 | −18 | 1 | −7 | −7 | 0 |

TABLE 6

| GOM | GOM 1 | GOM 2 | GOM 3 |
|---|---|---|---|
| Total waxes (% mass) | 14.72 | 12.95 | 13.56 |
| CFPP (° C.) NF EN 116 | −6 | −5 | −7 |
| CPP (° C.) NF-T60-105 | −15 | −12 | −12 |
| CP (° C.) NF EN 23015 | −7 | −5 | −5 |
| MV15 (kg/m$^3$) NF EN ISO12185 | 826.5 | 829.23 | 824.77 |
| Sulphur content (mg/kg) | 18.6 | 7.80 | 7.10 |
| Monoaromatics (% mass) NF EN 12916 | 19 | 15.7 | 15.7 |
| Diaromatics (% mass) NF EN 12916 | 4 | 2 | 1.8 |
| Triaromatics (% mass) NF EN 12916 | 0.3 | 0.5 | 0.5 |
| Total aromatics (% mass) NF EN 12916 | 23.3 | 18.2 | 18 |
| Polyaromatics (% mass) NF EN 12916 | 4.3 | 2.5 | 2.3 |
| Distillation ASTM D86 (° C.) | | | |
| 0% | 157.2 | 158.6 | 161.5 |
| 5% | 178.7 | 183.7 | 183.9 |
| 10% | 186.9 | 194 | 193.3 |
| 20% | 207.9 | 215.4 | 211.9 |
| 30% | 229.9 | 236.1 | 229.7 |
| 40% | 250.1 | 255.60 | 248.1 |
| 50% | 266.9 | 273.6 | 264 |
| 60% | 282 | 289.1 | 277.9 |
| 70% | 298.1 | 303.7 | 291.1 |
| 80% | 315.5 | 319.5 | 306.7 |
| 90% | 337.5 | 337.1 | 326.9 |
| 95% | 353.5 | 350 | 343.6 |
| 100% | 356.9 | 358.6 | 354.5 |
| MEVO content (% vol) | 0 | 5 | 0 |

The invention claimed is:

1. A method of improving the low-temperature properties of motor fuels and hydrocarbon liquid fuels, the method comprising adding one or more resins into the fuels, the resin being a modified alkylphenol-aldehyde resin obtained by a Mannich reaction of an alkylphenol-aldehyde condensation resin with:
   at least one aldehyde and/or one ketone having 1 to 8 carbon atoms; and
   at least one hydrocarbon compound having at least one alkylmonoamine or alkylpolyamine group (alkylamine) having between 4 and 30 carbon atoms;
   the alkylphenol-aldehyde condensation resin being obtained by condensation:
   of at least one alkylphenol substituted by at least one linear or branched alkyl group having 1 to 30 carbon atoms;

with at least one aldehyde and/or one ketone having 1 to 8 carbon atoms.

2. The method according to claim 1, further comprising improving the dispersion of waxes and/or for limiting the settling of waxes in at least one of: motor fuels and the liquid fuels, based on hydrocarbon oils and middle distillates the boiling temperature range of which is in the majority comprised between 100 and 500° C.

3. The method according to claim 1, wherein the fuels have a boiling range from 120 to 500° C.

4. A composition of motor fuels and liquid hydrocarbon fuels, a boiling temperature range of the fuel being in the majority comprised between 100 and 500° C., the composition comprising:
    a majority proportion of hydrocarbon compounds and/or vegetable and/or animal oils and/or their esters of oils and/or biodiesels of animal and/or vegetable origin;
    and a minority proportion of at least one of a modified alkylphenol-aldehyde resin obtained by a Mannich reaction of an alkylphenol-aldehyde condensation resin with;
        at least one aldehyde and/or one ketone having 1 to 8 carbon atoms; and
        at least one hydrocarbon compound having at least one alkylmonoamine or alkylpolyamine group (alkylamine) having between 4 and 30 carbon atoms;
    the alkylphenol-aldehyde condensation resin being obtained by condensation:
        of at least one alkylphenol substituted by at least one linear or branched alkyl group having 1 to 30 carbon;
        with at least one aldehyde and/or one ketone having 1 to 8 carbon atoms.

5. The method according to claim 3, wherein the motors fuels and/or fuels have a boiling range from 140 to 400° C.

6. The method according to claim 3, wherein the resins are incorporated in at least one of: jet fuels, gas oils or diesel motor fuels, fuel oil domestic, or heavy fuel oils.

7. The compositions according to claim 4, comprising between 5 and 5,000 ppm by mass of at least one of the resins.

* * * * *